United States Patent [19]
Smart et al.

[11] Patent Number: 5,020,045
[45] Date of Patent: May 28, 1991

[54] FOCUS ACQUISITION SERVO SYSTEM AND ASSOCIATED METHOD

[75] Inventors: Gerald J. Smart; Daniel L. Nelson, both of Penfield, N.Y.

[73] Assignee: Eastman Kodak Company, Rochester, N.Y.

[21] Appl. No.: 286,094

[22] Filed: Dec. 19, 1988

[51] Int. Cl.$^5$ .............................................. G11B 7/00
[52] U.S. Cl. ............................................... 369/44.29
[58] Field of Search ............... 369/44.27, 44.29, 44.30; 250/201.5

[56] References Cited

U.S. PATENT DOCUMENTS

| | | | |
|---|---|---|---|
| 4,396,959 | 8/1983 | Harrison et al. | 360/77.03 |
| 4,446,546 | 5/1984 | Miller | 369/44.29 |
| 4,497,047 | 1/1985 | Fujiie et al. | 369/44.28 |
| 4,512,003 | 4/1985 | Kimura et al. | 369/44.29 |
| 4,544,837 | 10/1985 | Tanaka et al. | 369/44.29 |
| 4,677,605 | 6/1987 | Abed | 369/44.29 |
| 4,733,066 | 3/1988 | Konno et al. | 369/44.29 |
| 4,740,679 | 4/1988 | Doi | 369/44.29 |
| 4,769,801 | 9/1988 | Funada et al. | 369/44.29 |
| 4,819,220 | 4/1989 | Miyazaki et al. | 369/44.29 |

Primary Examiner—Donald McElheny, Jr.
Attorney, Agent, or Firm—Edward Dugas

[57] ABSTRACT

A focus acquisition servo system and method which speeds the acquisition process by focusing on the recording media of an optical disk while the disk is coming up to speed. Focus is accomplished by jumping the focus actuator from a start position close to the focus position and by ramping the focus actuator away from the surface of the disk while monitoring focus gain. When the focus gain reaches a peak amplitude the disk is in rough focus, ramping is stopped and the focus servo system is activated to lock the focus actuator onto a fine focus on the disk's recording media.

10 Claims, 4 Drawing Sheets

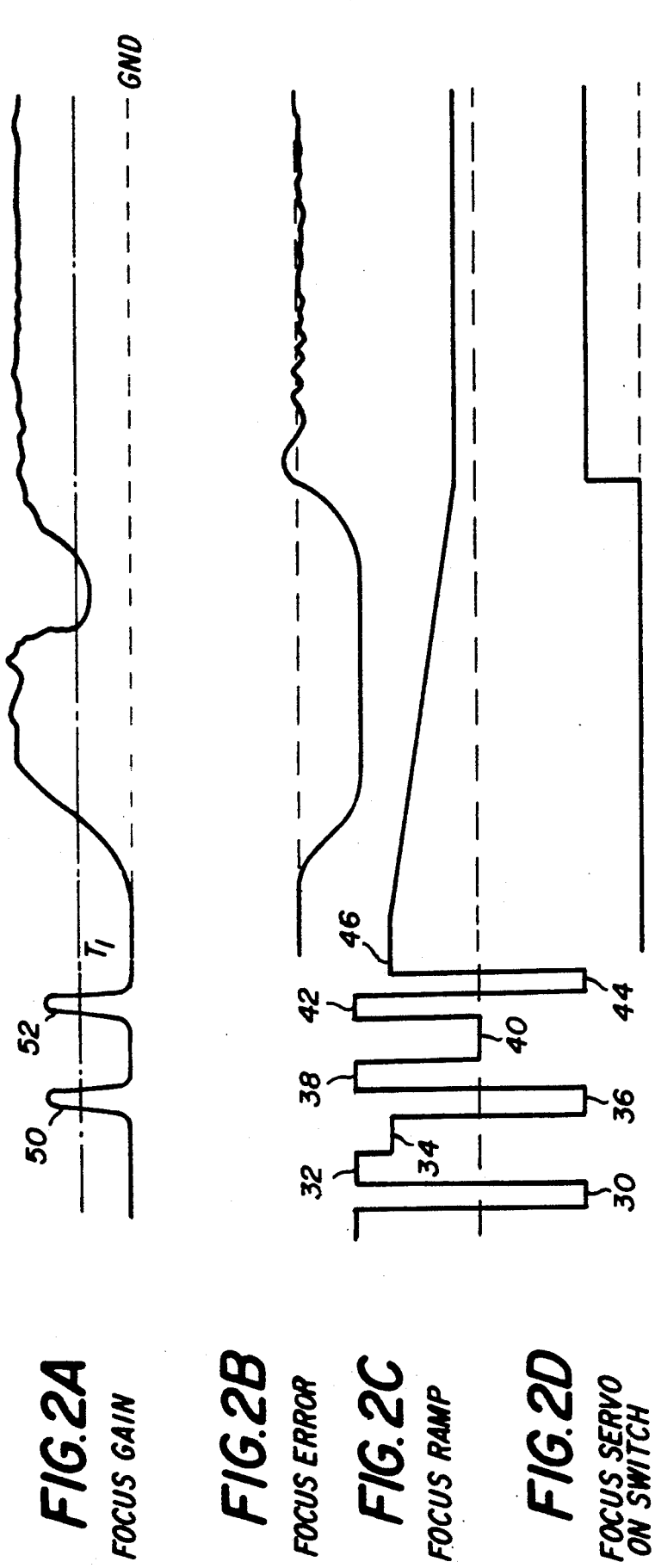

FOCUS ACQUISITION SERVO SYSTEM AND ASSOCIATED METHOD

TECHNICAL FIELD OF THE INVENTION

The present invention is related to the field of automatic focusing of a light beam onto the surface of a recording medium and, more particularly, to a system and associated method for quickly acquiring focus on the surface of a rotating optical recording disk.

BACKGROUND OF THE INVENTION

Storage systems that use optical disks as the storage media lose time when access to the recorded data waits upon the optical focusing servomechanism to acquire focus onto the recording surface of the spinning optical disk.

A patent of interest for its teachings relevant to the state of the art is U.S. Pat. No. 4,497,047 entitled "Optical Disk Player with Focus Control During Search Mode" by K. Fujiie et al. The focusing control system of the patent responds to the need of quickly acquiring focus when shifting transversely across a plurality of tracks to a new read position. The system reduces the gain of the focusing servo but maintains servo control at a defocused level such that the servo control system does not have to commence the acquisition of focus at the new read position from a start or reference position. Additionally, if a sharp focus was to be maintained as the objective lens moved in the traverse manner across the recording tracks it would be subjected to vibratory movements as the servo mechanism attempted to lock onto the different refelective patterns that passed through the field of view of the lens as it was moved to the new read position.

Another patent of interest is U.S. Pat. No. 4,512,003 entitled "Control Circuitry for Preliminary Focusing of Light on a Record Medium Surface in an Optical Reproducing Apparatus" by S. Kimura et al. The apparatus of the patent uses a preliminary focusing signal which is derived from a signal generator such that a first polarity signal, that varies rapidly at one polarity and then varies slowly towards a second predetermined level of opposite polarity, creates a zero crossover point corresponding to a preliminary focus point for the servo system. Once preliminary focusing is achieved, the system shifts into the second level of focus utilizing a focus error signal generated by the focusing servo.

A third patent of interest is U.S. Pat. No. 4,677,605 entitled "Focus Acquisition and Maintenance for Optical Disk System" by M. Abed. In the system of that patent there is also disclosed a two-level focusing technique which utilizes the asymmetrical properties of a light beam reflected from the surface of the recording disk onto a quad detector wherein the electrical signals resulting therefrom are compared against a threshold value as the objective lens is driven towards a focusing position and when the electrical signals' value compares to a known threshold value, indicating a coarse focus, the system is switched to a fine focus servo configuration so that the fine focus can be achieved. Additionally, in column 8, lines 41–49, it is mentioned that the method of the invention is used to avoid a false focus on the overcoat layer of the optical disk. This is accomplished by having the objective lens relatively close to the disk or focused behind the disk and as the objective lens is ramped away from the disk the first legitimate focus appears on the recording material and not on the overcoat layer. In this manner a false focus is averted.

A fourth patent of interest is U.S. Pat. No. 4,396,959 entitled "Data Transducer Position Control System for Rotating Disk Data Storage Equipment" by J. N. Harrison et al. The system of that patent uses wide-driving pulses to quickly move an optical head across many tracks when the track to be focused on is located a considerable distance from the optical head's initial position.

SUMMARY OF THE PREFERRED EMBODIMENTS

In the method embodiment of the present invention a focus acquisition servo system of the type that is used to focus a read beam onto the recording surface of an optical disk, of the type that has an overcoat layer, is achieved by commencing focus on the optical disk as it is spinning up to speed and by initiating an optimal two-step jump of the actuator to place it close to the desired focus position. The actuator is first accelerated (jumped) at maximum acceleration in the direction which is desired and then decelerated at maximum allowable deceleration to a rest position. The focus gain is monitored during movement to see if the disk surface (focus) has passed under the lens. If not, then the actuator is jumped again until the disk surface (focus) does pass under the lens. At this point the lens can be jumped back and ramped to the desired focus position. While speed is being achieved, the read function of the system is activated and the lens system is then ramped to the desired focus position.

Additionally, with a preformatted disk an address can be read to verify that the actuator is focused on the disk and not on the cover sheet.

Attempting to focus on a disk as it is spinning up to speed is further complicated by the fact that the edges of the disk tend to wobble causing the recording surface to move up and down with a wave action. The present invention overcomes this complication.

From the foregoing it can be seen that it is a primary object of the present invention to provide an improved optical focus acquisition system and method.

It is another object of the present invention to provide a system for focusing quickly onto the surface of an optical disk by commencing the focus operation as the disk is coming up to speed which facilitates final focusing when the disk is at speed.

These and other objects of the present invention will become more apparent when taken in conjunction with the following drawings wherein like characters indicate like parts and which drawings form a part of the present description.

BRIEF DESCRIPTION OF THE DRAWINGS

FIGS. 2A–2D are a group of waveforms illustrating the signals appearing at selected locations in the apparatus depicted in FIG. 1.

DESCRIPTION OF THE PREFERRED EMBODIMENTS

Figure 1:
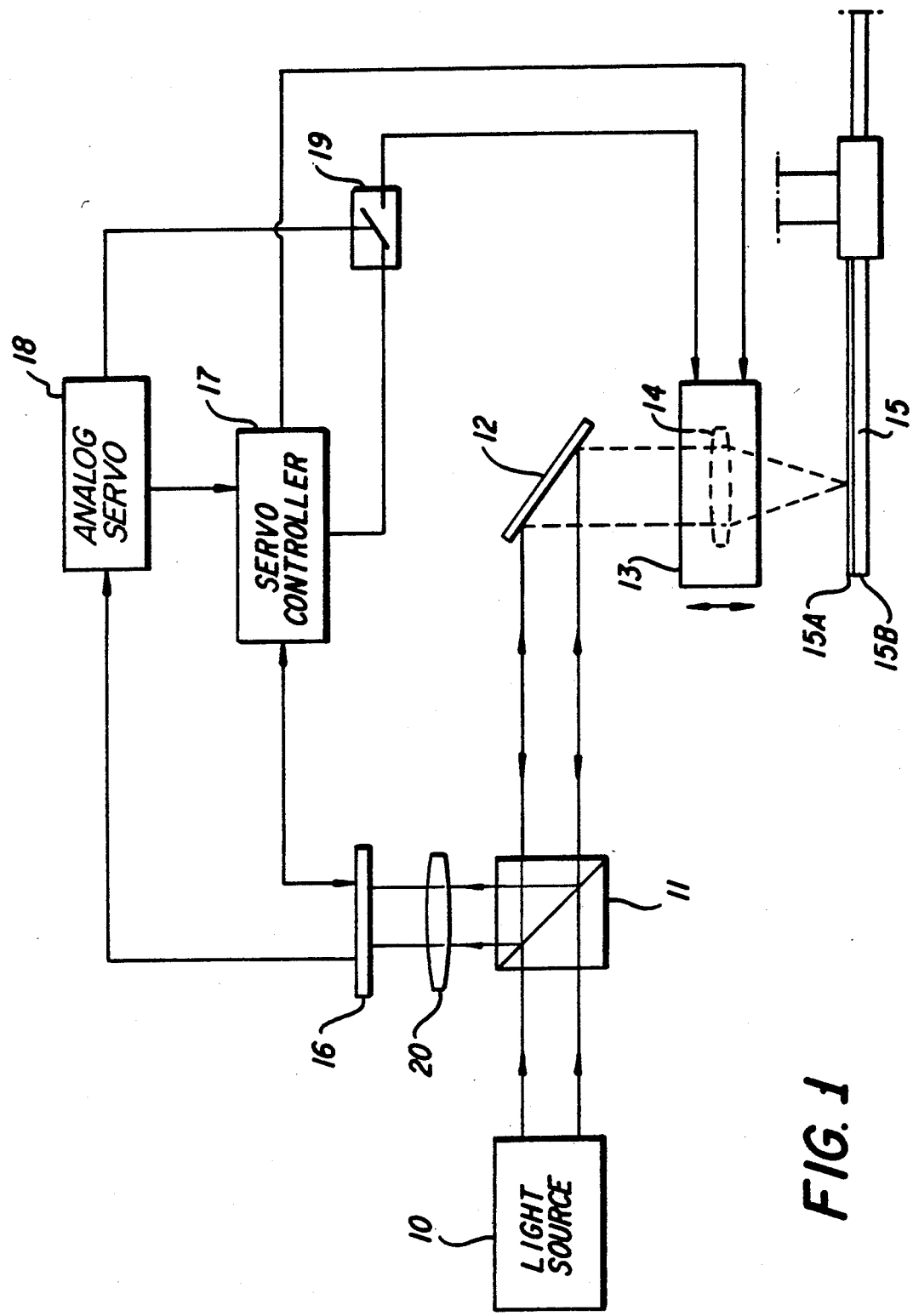
FIG. 1 is a block diagram of the preferred apparatus embodiment of the invention.

In FIG. 1 there is illustrated an optical focusing system for an optical recording disk 15. The system utilizes a coherent light source, such as a laser 10, for directing a light beam through a prism set 11 and onto a mirror 12 which in turn directs the light beam through a focus actuator 13, containing an object lens 14, and onto the recording surface 15B of an optical recording disk 15. The optical recording disk 15 generally, has an overcoat layer 15A which is used to protect the recording surface 15B. Reflected light, from the optical recording disk, passes back through the object lens 14 to the mirror 12 and to the reflective surface 21, within the prism 11, which directs the reflected light to a lens 20 and onto a quad photodetector 16. The photodetector 16 converts the light beam impinging thereon into two analog electrical signals, FOCUS ERROR and FOCUS GAIN by interconnecting each of the four photodetectors in a well-known manner. The analog signals are coupled to a digital servo controller 17 through A/D converters 24 and 22, respectively. The FOCUS ERROR signal is also an input to an analog servo 18. The output signal from the analog servo 18 is applied to a first switch terminal of a SPST switch 19. The switch 19 is activated by a signal from the servo controlled 17. A two-input summer 28 has one +input connected to a second switch terminal of the switch 19 and the other +input connected to receive an output from the servo controller 17 via a D/A converter 26. The signal from the summer 28 drives the focus actuator 13 towards or away from the disk 15.

Referring to FIG. 2C, from a start position the actuator 13 is pulsed with a voltage pulse 30 of magnitude and width to cause the actuator to move with a maximum acceleration (jump) towards a first position. The pulses are generated by the servo controller 17. Immediately thereafter a deceleration pulse 32 is applied to the actuator to cause the actuator to rest at the first position evidenced by the horizontal line 34. At this point, focus has not been passed (determined by observing FOCUS GAIN FIG. 2A). A second pulse 36 is applied, followed by a deceleration pulse 38 which causes the actuator to move quickly to a second rest position evidenced by the horizontal line 40. As the actuator moved between the first position and the second position the desired focus positioned was passed as evidenced by the peak 50 in the FOCUS GAIN signal. At this point, the actuator is impulsed with a pulse 42 driving the acutuator back towards the first position and with a deceleration pulse 44 to reach the position evidenced by the horizontal line 46. At this position, the actuator passed the focus point again, as evidenced by the peak 52 in the FOCUS GAIN signal. Thereafter, the servo controller 17 outputs a FOCUS RAMP signal to drive the focus actuator to the desired focus position. As this is done, the FOCUS GAIN is shown increasing towards and past a first threshold level $T_1$ in response to a FOCUS RAMP signal, illustrated in FIG. 2C, driving in a downward ramp direction which corresponds to the focus actuator (object lens 14) being driven away from the recording surface 15B of the optical disk 15 and simultaneously, the FOCUS ERROR signal, illustrated in FIG. 2B, is shown increasing towards a negative peak value. With the FOCUS GAIN passing the threshold, the FOCUS ERROR signal begins to reach its peak negative value indicating that the objective lens is being driven towards a correct focus position. With the FOCUS ERROR signal changing from a negative value to a positive value and the FOCUS GAIN being at a maximum value the ramping operation is terminated and the focus servo is switched ON, as referenced by the step in the waveform of FIG. 2D, by a switching signal from the servo controller 17, which closes the switch 19.

Figure 3A:
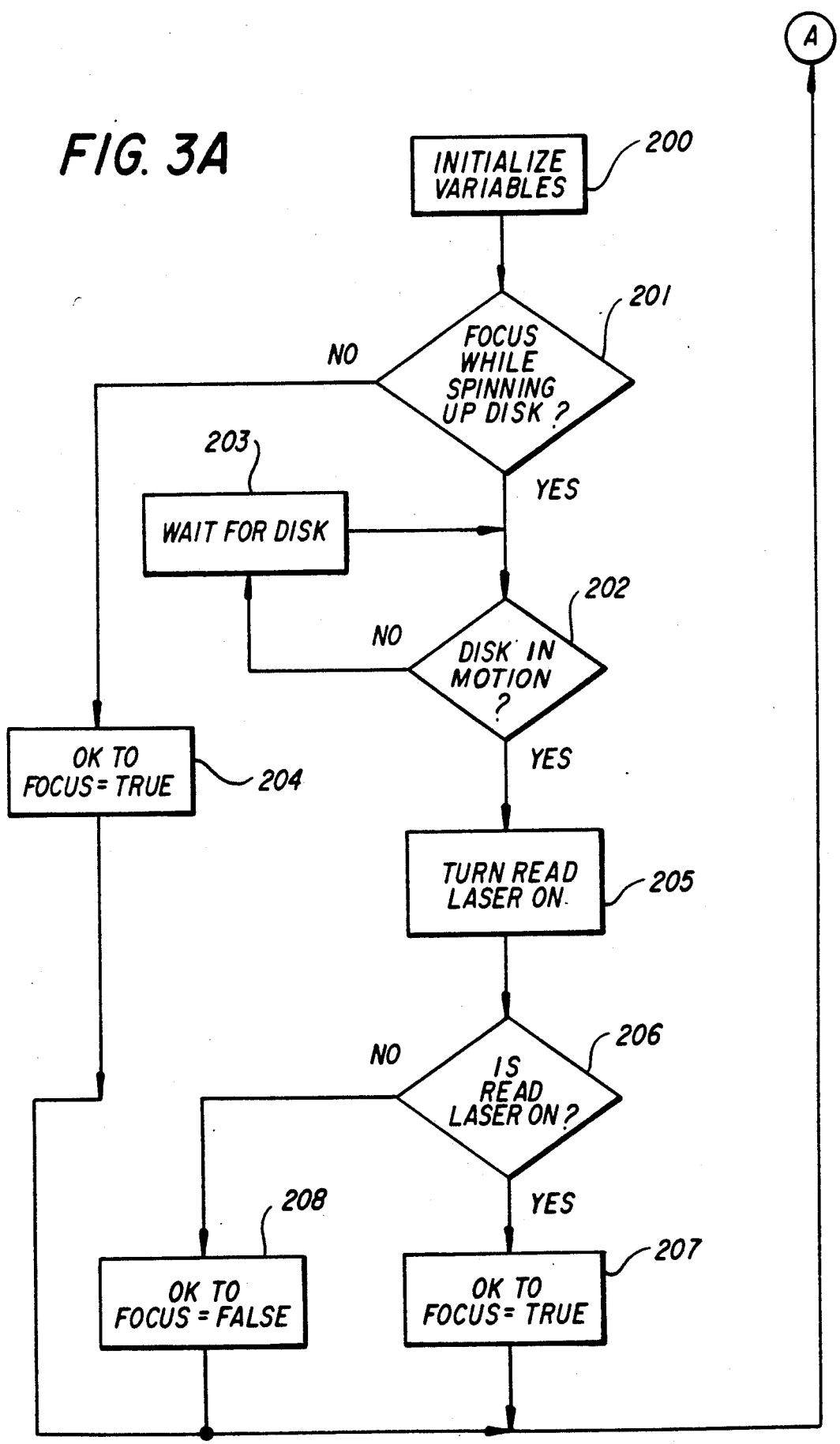
FIGS. 3A and 3B, connected at the point labeled Ⓐ, illustrate in flow chart form the operating sequence of the preferred method of the present invention.
Figure 3B:
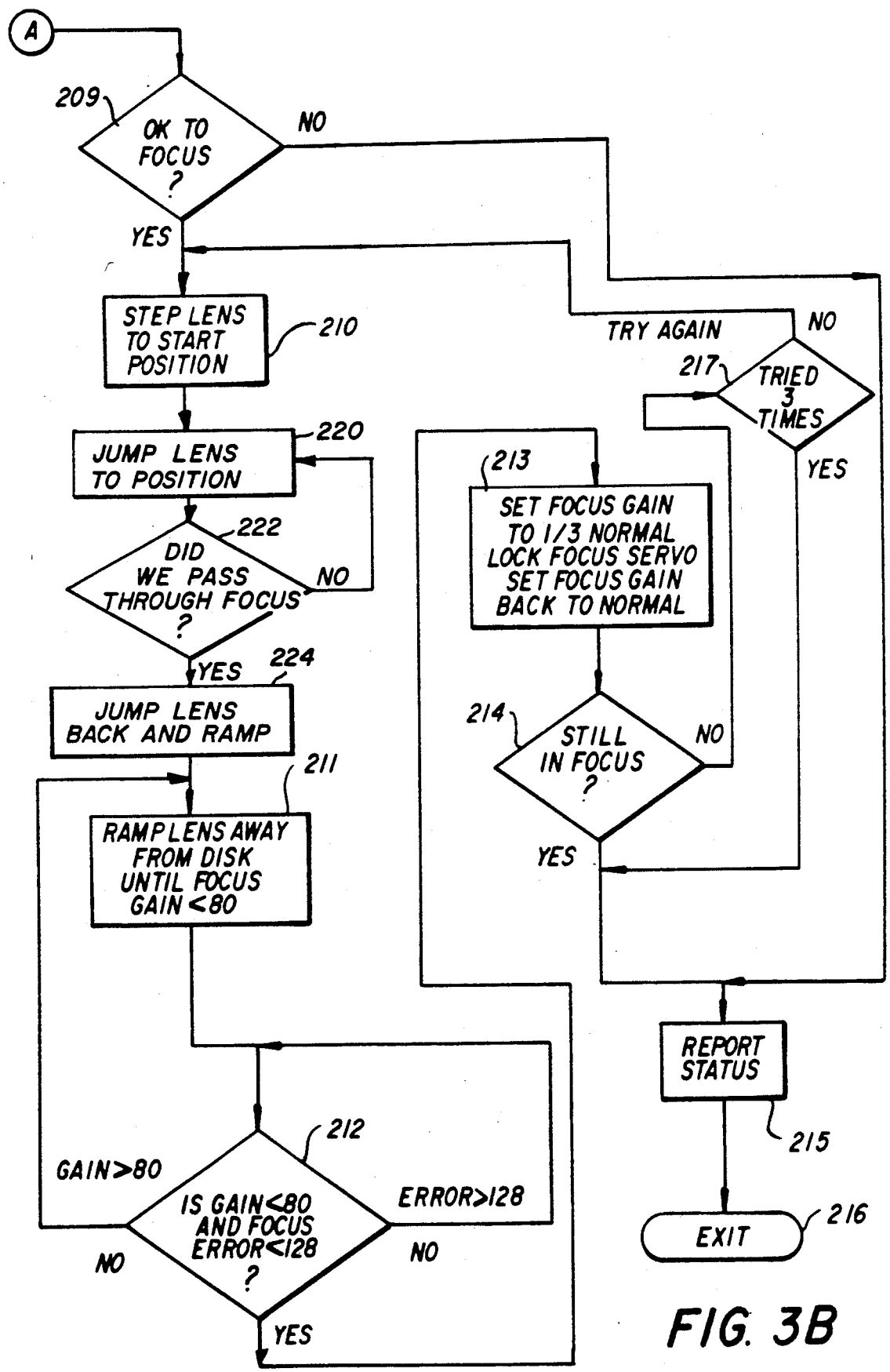

Referring now to FIGS. 3A and 3B, which illustrate the operation method of the preferred apparatus embodiment in flow diagram form, the system is initialized in operation via the initialized variables block 200 which then moves the operating sequence to the question block 201 which requests whether focus is to be acquired while spinning up the disk. If the answer is NO, the system goes to block 204 to achieve focus in the classical manner by following the flow along the line labeled Ⓐ. If the answer is YES, focus is initiated for the quick mode and the question block 202 is activated, sampling the motion of the disk to answer YES when the disk is in motion. If the answer is NO, the question block 202 branches to block 203 which waits for the disk to start moving before outputting an inquiry to block 202. When the disk is in motion, question block 202 will output a YES answer which will turn on the read laser per the action block 205. If the read laser is not turned on as an answer to the questioning block 206, a NO branch will occur to a block 208 which will provide a false signal along the line terminating with an Ⓐ. That line will be picked up at the input to a question block 209. The question asked will be is it OK to focus with the read laser off. If the answer is NO, a branch will be taken to a report status block 215 indicating a fault status and the program will exit at block 216. If the answer to the questioning block 209 is YES, focusing will be activated by stepping the objective lens (activator) to a start position as evidenced by action block 210. With the objective lens at the start position it is jumped to a first position by action block 220 and the gain is monitored to determine if the lens moved past the focus position. This question is asked in block 222. If the answer is NO the lens is jumped again. This process continues until the answer is YES. The lens is then jumped back, by action block 224. The magnitude of the jump varies for different systems and is ideally adjusted to provide the required crossing of focus within two jumps. Next, the lens will be ramped away from the disk until the focus again is at some value below a threshold. In the preferred embodiment, the threshold value was a gain of 80. This is reflected in the action block 211. Once achieved, the system moves to the question block 212 which questions whether the gain is below the threshold value and additionally whether the FOCUS ERROR signal is below a predetermined threshold. If the answer is YES, the system branches to block 213 which sets the FOCUS GAIN at some nominal value and locks the focus servo into its fine focusing mode. Once accomplished, a question block 214 questions whether focus has been achieved. If the answer is NO, the system branches to a question and action box 217 which permits three retries for focus before moving to a report status mode 215 (reporting a default). If the system is in focus the report status mode 215 is entered indicating the achievement of the fine focus.

Moving back to the questioning block 212, if the FOCUS ERROR signal is greater than a threshold value, in the preferred embodiment the threshold is 128, a NO response is achieved from the question block 212 and the program branches back to the input to the question block 211 until the FOCUS ERROR signal reaches a value which is below 128. In a like manner, if the FOCUS GAIN is greater than 80, the program branches back to the input to action block 211 and ramps the lens further away from the disk until the FOCUS GAIN is less than 80.

The flow diagram steps shown in FIGS. 3A and 3B can be implemented with a software program for driving the servo controller 17.

In conclusion, there has been described a system (apparatus) and a method for quickly acquiring focus onto the recording surface of an optical disk by focusing the optical system onto the recording medium as the disk starts spinning and by jumping the actuator to a position close to the final focus position while the disk is reaching operational speed and by switching in the servo to quickly focus onto the recording surface rather than the protective surface.

While there has been shown what are considered to be the preferred embodiments of the invention, it will be manifest that many modifications may be made therein without departing from the essential spirit of the invention. It is intended, therefore, in the annexed claims to cover all such changes and modifications as may fall within the true scope of the invention.

What is claimed is:

1. A focus acquisition servo system comprising:
   a source of coherent light,
   a rotatable optical disk having a recording surface;
   lens means for directing the coherent light from said source onto the recording surface of said rotatable optical disk;
   actuator means coupled to said lens means for moving said lens means in response to a signal;
   detector means responsive to the reflection of light from the recording surface of said rotatable optical disk for generating a focus error signal and a focus again signal;
   servo controller means responsive to said focus error signal and said focus gain signal for providing a control signal to said actuator means for jumping said lens means to a first position as the rotatable optical disk is spinning up and for determining if a focus on said recording surface has been passed, if not, jumps are continued until a focus has been passed, said servo controller providing a backwards jump past the focus and thereafter a ramping signal to move the actuator means to the focus position, said servo controller providing a switching signal when focus is achieved;
   analog servo means receiving as an input said focus error signal for providing a signal for driving said actuator means to focus said lens means on said recording surface; and
   switch means responsive to the switching signal provided by said servo controller for connecting the output signal of said analog servo means to said actuator means for driving said actuator means to maintain focus.

2. A focus acquisition servo system according to claim 1 and further comprising:
   summing means interposed between said switch means and said actuator means and said servo controller means and said actuator means for directing the provided signal from said servo controller and the provided signal from said analog servo means to said actuator means.

3. A focus acquisition servo system according to claim 1 wherein said servo controller means is a digital servo controller.

4. A focus acquisition servo system according to claim 3 further comprising:
   analog-to-digital converter means for converting the generated analog focus error signal and analog focus gain signal to digital signals; and
   digital-to-analog converter means for converting the digital signal from said servo controller means to an analog control signal.

5. A focus acquisition servo system according to claim 1 wherein said detector means is a quad photodetector.

6. A focus acquistion servo system for quickly focusing a light beam on the recording surface of an optical disk comprising:
   optical means for directing a beam of light to the recording surface of an optical disk;
   focusing means for causing the point of focus to move in response to a control signal;
   detector means for detecing the light refelected from the surface of the optical disk and for providing signals indicative of the point of focus of said focusing means with respect to the recording surface of the optical disk; and
   controller means for commencing focus on the recording surface of the optical disk by providing a control signal which accelerates the focusing means to a focus position in jumps and decelerates the focusing means to a rough focus position and, upon reaching the rough focus position, provides a ramping control signal to drive the focusing means to a fine focusing position.

7. A focus acquistion servo system for quickly focusing a light beam on the recording surface of an optical disk in accordance with claim 6 and further comprising:
   servo means responsive to the signals from said detector means for providing a control signal to said focusing means to maintain the point of focus on the recording surface of the optical disk.

8. A focus acquisition servo system for quickly focusing a light beam on the recording surface of an optical disk in accordance with claim 7 and further comprising:
   switch means interposed between said servo means and said focusing means, and responsive to an output signal from said controller means for connecting the control signal from said servo means to said focusing means when the focusing means reaches the fine focusing position.

9. A method for quickly acquiring focus on the surface of an optical recording disk using a focus acquisition servo system positioning a focusing lens comprising the steps of:
   (a) commencing focus as the disk starts to spin;
   (b) jumping the focusing lens towards a focus position while monitoring focus gain;
   (c) determining whether the focus position has been passed, if not, jumping the focusing lens again as in step (b);
   (d) with the focusing position passed, jumping the focusing lens back and commencing a ramping to the focus position; and
   (e) maintaining the focus position.

10. A method for quickly acquiring focus on the surface of an optical recording disk using a focus acquisition servo system positioning a focusing lens according to claim 9 wherein the step of jumping is accomplished with a maximum acceleration towards a focus position followed by a maximum deceleration to a rest position.

* * * * *